Nov. 3, 1942.   H. F. WHITCOMB, JR., ET AL   2,300,477
ROLLER SKATE
Filed Dec. 12, 1940
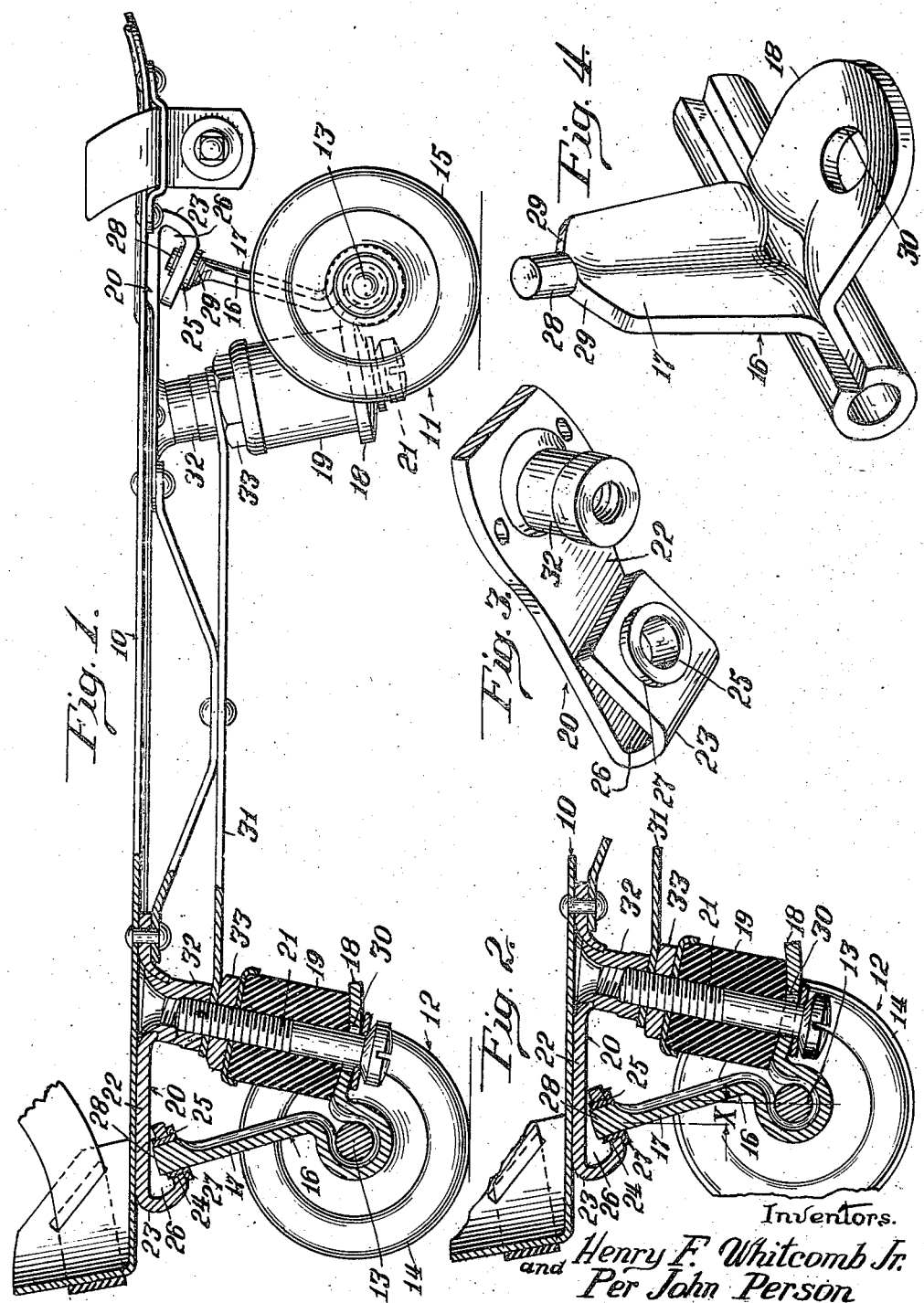
Inventors.
Henry F. Whitcomb Jr.
and Per John Person
By Barnett & Truman
Attorneys Patented Nov. 3, 1942

2,300,477

UNITED STATES PATENT OFFICE 2,300,477

ROLLER SKATE

Henry F. Whitcomb, Jr., and Per John Person, Chicago, Ill., assignors to Richardson Ball Bearing Skate Company, Chicago, Ill., a corporation of Illinois Application December 12, 1940, Serial No. 369,728

3 Claims. (Cl. 280—11.28)

This invention relates to improvements in roller skates of the general type shown in the applicant Whitcomb's prior Patent 1,640,476 dated August 30, 1927.

In skates of the above general type, each truck of the skate includes a carried member which is pivotally attached to the foot plate of the skate and normally holds the truck in alignment therewith, but which, when the foot plate is tilted laterally, automatically moves the truck about its vertical axis so that the skate will follow a curved path.

One object of the present invention is to provide in a skate of the above character, improved means for connecting the roller trucks to the foot plate, whereby the parts are so arranged and constructed as to relieve them of severe strains during operation and to give the trucks greater range of movement and more freedom of action than is provided by skate constructions heretofore proposed and used and which, at the same time, make it practicable to form the truck carriers and the cooperating hanger members of relatively light metal or of molded plastic.

In connection with the above object the invention includes a carrier for each truck having a cushion supporting seat at one side of the axle and having a socket-engaging arm at the other side, the latter of which extends upwardly from the axle and pivotally engages a socket formed in an associated truck hanger fixed to the foot plate. The said arm inclines rearwardly, but at a relatively small angle from the vertical so that the vertical pressure imposed on the arm is directed lengthwise of the arm and therefore has little or no tendency to flex the arm. The arrangement, together with the provision of a relatively large opening in the cushion supporting seat so as to permit movement of the seat transversely of an attaching bolt associated therewith, provides the desired freedom of action at the connections of the truck with the hanger and also permits the truck to assume proper angular position when the skater executes abrupt as well as gliding turns when dancing and figure skating.

Another important object of the invention is to provide the various parts with the arrangement above described together with certain improved constructions, all of which cooperate to minimize wear of the parts, simplify and expedite replacement and repair of the parts and which also simplify the manufacture of said parts when they are made either of metal stamping or of molded plastic.

Various other objects and advantages of the improvements herein disclosed will be obvious to those skilled in the art from the description of the embodiment shown in the drawing. It will be understood, therefore, that the present invention consists in the novel construction, arrangement and combination of parts hereinafter shown and described, together with all variataions and changes in structure coming within the scope of the several claims.

In the drawing:

Fig. 1 is a side view of a roller skate, partly in section, illustrating the improvements of the present invention.

Fig. 2 is a fragmentary sectional view of the rear truck hanger and carrier members in a different position from that shown in Fig. 1.

Fig. 3 is a fragmentary view, shown in perspective, of the truck hanger member, and Fig. 4 is a view in perspective of the axle carrier.

The skate comprises a foot plate 10 and front and rear trucks 11 and 12 attached to the foot plate with capacity for relative movement about their vertical axes when the foot plate is tilted laterally relative to the trucks.

Both of the trucks and the separate means for attaching them to the foot plate of the skate are of identical construction. Therefore, the rear truck only of the skate will be described. The corresponding parts of the forward truck and its associated attaching means will be identified by the same reference numerals used in the description of the rear truck.

The truck comprises an axle 13, a pair of rollers 14—15 suitably journaled on the axle, and an axle carrier 16. The said carrier includes a tubular portion, adapted to grip the central portion of the axle 13, a vertically extending arm 17 and a substantially horizontal seat 18 for a cushion member 19.

The axle carrier as above described is pivotally attached to the foot plate of the skate by means of a hanger member 20 and a screw bolt 21. The hanger comprises a plate 22 formed at one end with an enlargement 23. In the present embodiment the said enlargement is formed by bending the end of the plate upon itself to form a downwardly extending wedge-shaped loop. The lower portion of the loop is provided with a socket opening 24 for receiving a wear resisting bushing 25. The bushing is cylindrical and fits in the socket opening 24 with sufficient looseness to permit it to be readily removed by hand. If the removal of the bushing should be impeded by the collection of corrosion or other foreign matter in the socket opening, any suitable implement, for example the blade of a pocket knife, may be inserted in the opening 26 of the loop 23 and pressed against the inner end of the bushing to eject it from the socket opening. A shoulder 27 on the bushing limits the applying movement of the bushing and maintains the lower end thereof spaced from the loop. The central opening of the bushing loosely receives a stud 28 formed on the upper end of the arm 17, the fit of these members being sufficiently loose to permit free rotational movement of the stud 28 and also some slight angular movement thereof, for example when the foot plate and hanger members are tilted laterally relative to the truck. The lower end of the bushing normally bears on lateral shoulders 29—29 of the carrier arm 17 and holds these shoulders suitably spaced from the loop portion 23 of the hanger member when the foot plate and hanger are tilted laterally, as above described. The said shoulders 29—29 of the carrier arm serve to support the bushing 25 in its proper position when the truck is suitably clamped to the hanger.

The skate truck is clamped to the hanger member by means of the bolt 21. It extends upwardly through an opening 30 in the seat portion 18 of the axle and has threaded engagement with a portion of said hanger 20. The bolt opening 30 is somewhat larger than the bolt 21 so as to permit the said seat portion 18 to move transversely of the bolt. This movement of the seat 18 together with the capacity for greater freedom of pivotal action, because of the location of the socket connection 25 relatively close to the plane of the vertical axis of the truck, permits the truck to assume pronounced angular positions relative to the longitudinal center of the foot plate when the skater is making an abrupt turn. The location of the said socket connection 25 in close relation to the plane of the vertical axis of the truck (see dimension X in Fig. 1) also makes it practicable to minimize the length of the carrier arm 17 and its angle of inclination from the vertical, whereby the major portion of the strains transmitted to the arm are directed lengthwise thereof and therefore have little or no tendency to flex the arm.

The cushion 19, preferably of resilient rubber, is held in position on the concaved upper surface of the seat 18 and is maintained under suitable compression by lengthwise adjustment of the bolt 21. If desired, a rigidifying brace 31 may be clamped between the portion 32 of the hanger member and a lock nut 33 on said bolt.

The compression of the rubber cushion 19 will be sufficient to normally maintain the bolt 21 in a central position in opening 30. The tendency of the cushion to resume its normal position, after having been distorted laterally or lengthwise of the skate by shifting movement of the seat 18 relative to the bolt 21, insures return of the skate trucks from various angular positions to their normally aligned positions.

When it is desired to repair a skate to remove excessive looseness in the pivotal connection 25, the screw bolt 21 may be loosened sufficiently to permit the stud 28 and the bushing 25 to be withdrawn from the socket opening 24 of the hanger member. A new bushing of proper size may be applied to the stud 28. Both the said stud and bushing are then inserted in the socket opening 24 and the screw bolt 21 re-tightened to produce the desired compression of the cushion 19 and to hold the bushing in position.

We claim:

1. In a roller skate having a foot plate and a truck including an axle carrier formed with an upwardly extending arm; means for pivotally attaching the truck to the foot plate comprising a hanger member secured to the foot plate and provided at one end with an enlargement formed with a vertically extending socket opening; a bushing member loosely positioned in said opening to permit ready removal therefrom and adapted to receive the upper end of said arm, there being an opening in said enlargement communicating with the upper end of said bushing, whereby a space is provided between the said upper end of the bushing and the hanger member adapted to receive an implement to facilitate removal of said bushing, in the manner described.

2. In a roller skate having a foot plate and a truck including an axle carrier formed with an upwardly extending arm; means for pivotally attaching the truck to the foot plate comprising a hanger member secured to the foot plate and formed at one end with a downwardly looped portion providing an enlargement having a transverse opening, there being a vertically extending socket opening formed in the lower face of said looped portion and communicating with said transverse opening, and a bushing member removably positioned in said socket opening and adapted to receive the upper end of said arm with capacity for free sliding movement thereof lengthwise of the bushing.

3. In a roller skate having a foot plate and a truck including an axle carrier formed with an upwardly extending arm; means for pivotally attaching the truck to the foot plate comprising a hanger member secured to the foot plate and formed at one end with a downwardly looped portion providing an enlargement, there being a socket opening formed in said looped portion, and a cylindrical bushing member removably positioned in said socket opening and adapted to receive the upper end of said arm; the lower end of said bushing having a shoulder thereon for limiting the applying movement thereof and for providing clearance between said looped portion of the hanger and a portion of said arm.

HENRY F. WHITCOMB, JR.
PER JOHN PERSON.

CERTIFICATE OF CORRECTION.

Patent No. 2,300,477.  November 3, 1942.

HENRY F. WHITCOMB, JR., ET AL.

It is hereby certified that error appears in the printed specification of the above numbered patent requiring correction as follows: Page 2, second column, line 53, claim 3, after "in" insert --the lower face of--; and that the said Letters Patent should be read with this correction therein that the same may conform to the record of the case in the Patent Office.

Signed and sealed this 22nd day of December, A. D. 1942.

(Seal)

Henry Van Arsdale,
Acting Commissioner of Patents.